(12) United States Patent
Jeffries (10) Patent No.: US 12,470,758 B2
(45) Date of Patent: **\*Nov. 11, 2025**

(54) MECHANISM TO AUTOMATE THE AGGREGRATION OF INDEPENDENT VIDEOS FOR INTEGRATION

(71) Applicant: James R. Jeffries, Salt Lake City, UT (US)

(72) Inventor: James R. Jeffries, Salt Lake City, UT (US)

(73) Assignee: James R. Jeffries, Salt Lake City, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/508,147

(22) Filed: Nov. 13, 2023

(65) Prior Publication Data

US 2024/0089520 A1 Mar. 14, 2024

Related U.S. Application Data

(63) Continuation of application No. 17/686,216, filed on Mar. 3, 2022, now Pat. No. 11,818,408.

(60) Provisional application No. 63/156,154, filed on Mar. 3, 2021.

(51) Int. Cl.
| | |
|---|---|
| *H04N 21/236* | (2011.01) |
| *H04N 21/2368* | (2011.01) |
| *H04N 21/238* | (2011.01) |
| *H04N 21/2387* | (2011.01) |
| *H04N 21/43* | (2011.01) |
| *H04N 21/84* | (2011.01) |

(52) U.S. Cl.
CPC ..... *H04N 21/2368* (2013.01); *H04N 21/2387* (2013.01); *H04N 21/4307* (2013.01); *H04N 21/84* (2013.01)

(58) Field of Classification Search
CPC .......... H04N 21/2368; H04N 21/2387; H04N 21/4307; H04N 21/84
USPC ..................................................... 375/240.28
See application file for complete search history.

(56) References Cited

U.S. PATENT DOCUMENTS

| | | | |
|---|---|---|---|
| 11,631,146 B2 | 4/2023 | Hauser et al. | |
| 2017/0142462 A1* | 5/2017 | Uhrich | H04N 21/2387 |
| 2018/0061457 A1 | 3/2018 | Fisher et al. | |
| 2019/0108419 A1 | 4/2019 | Coven et al. | |
| 2019/0110096 A1 | 4/2019 | Shaw et al. | |
| 2019/0311743 A1 | 10/2019 | Shen et al. | |

(Continued)

*Primary Examiner* — Dominic D Saltarelli
(74) *Attorney, Agent, or Firm* — Kunzler Bean & Adamson; Bryan W. Pitt (57) ABSTRACT

A method to automate the aggregation of independent videos for integration includes receiving input data from a user and identifying two or more recorded videos based on the input data, wherein each recorded video comprises metadata. Said method may include determining, based at least in part on the metadata, that the two or more recorded videos are candidates for linking and linking the two or more recorded videos. The method may include playing the two or more recorded videos, wherein playing the two or more recorded videos comprises synchronizing the two or more recorded videos based at least in part on the metadata of the two or more recorded videos. Said method may be implemented using a video network system, a video apparatus, and/or a computer program product comprising executable code.

20 Claims, 6 Drawing Sheets

(56) References Cited

U.S. PATENT DOCUMENTS

2020/0177959 A1\* 6/2020 Grouf .................. H04N 21/435
2021/0011946 A1 1/2021 Haitsuka et al.

\* cited by examiner

MECHANISM TO AUTOMATE THE AGGREGATION OF INDEPENDENT VIDEOS FOR INTEGRATION

CROSS-REFERENCE TO RELATED APPLICATIONS

This application is a continuation of U.S. application Ser. No. 17/686,216 filed on Mar. 3, 2022, which claims priority to U.S. Patent Application Ser. No. 63/156,154 entitled "MECHANISM TO AUTOMATE THE AGGREGATION OF INDEPENDENT VIDEOS FOR INTEGRATION" and filed on Mar. 3, 2021 for James Jeffries, which is incorporated herein by reference in its entirety.

FIELD

This invention relates to recorded videos, integrated media players, and more particularly to automatically combining multiple independent video recordings into a single interface for playback notification.

BACKGROUND

Many different types of devices are capable of recording video. Users of these devices may record the same event or different events simultaneously, but they may film from different locations or viewpoints. Watching the multiple recorded videos in sync with one another may be difficult.

SUMMARY

A mechanism to automate the aggregation of independent videos for integration includes a video networking platform comprising one or more user accounts that upload one or more recorded videos having metadata to a video networking platform. A playing module plays the one or more displayed recorded videos and synchronizes the one or more recorded videos based at least in part on the metadata of the recorded video.

A method is provided that stores the recorded video and audio and metadata of the recorded video and audio, the metadata comprising a time that the recorded video and audio was recorded.

The method also automates the selection of a plurality of recorded video and audio, wherein each recorded video and audio were recorded on different devices not directly networked together.

The method further enables a user, via an interface, to select alternative audio tracks to automatically be integrated with the plurality of recorded video.

The method also automates the play back of the plurality of recorded video and audio, wherein playing the plurality of recorded video and audio comprises synchronizing the plurality of recorded video and audio based at least in part on the metadata of each of the recorded video and audio.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention, and are not therefore to be considered to be limiting of its scope, the invention will be described and explained with additional specificity and detail through the use of the accompanying drawings, in which.

DETAILED DESCRIPTION

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer readable medium may be a tangible computer readable storage medium storing the program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store program code for use by and/or in connection with an instruction execution system, apparatus, or device.

The computer readable medium may also be a computer readable signal medium. A computer readable signal medium may include a propagated data signal with program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport program code for use by or in connection with an instruction execution system, apparatus, or device. Program code embodied on a computer readable signal medium may be transmitted using any appropriate medium, including but not limited to wire-line, optical fiber, Radio Frequency (RF), or the like, or any suitable combination of the foregoing.

In one embodiment, the computer readable medium may comprise a combination of one or more computer readable storage mediums and one or more computer readable signal mediums. For example, program code may be both propagated as an electro-magnetic signal through a fiber optic cable for execution by a processor and stored on RAM storage device for execution by the processor.

Program code for carrying out operations for aspects of the present invention may be written in any combination of one or more programming languages, including an object oriented programming language such as Java, Smalltalk, C++, PHP or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), a cellular network, a wireless network such as a Wi-Fi network, or the connection may be made to an external computer (for example, through the Internet using an Internet Service Provider).

The computer program product may be shared, simultaneously serving multiple customers in a flexible, automated fashion. The computer program product may be standardized, requiring little customization and scalable, providing capacity on demand in a pay-as-you-go model. The computer program product may be stored on a shared file system accessible from one or more servers.

The computer program product may be integrated into a client, server and network environment by providing for the computer program product to coexist with applications, operating systems and network operating systems software and then installing the computer program product on the clients and servers in the environment where the computer program product will function.

In one embodiment software is identified on the clients and servers including the network operating system where the computer program product will be deployed that are required by the computer program product or that work in conjunction with the computer program product. This includes the network operating system that is software that enhances a basic operating system by adding networking features.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by program code. The program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The program code may also be loaded onto a computer, other programmable data processing apparatus, or other devices to cause a series of operational steps to be performed on the computer, other programmable apparatus or other devices to produce a computer implemented process such that the program code which executed on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

Figure 1:
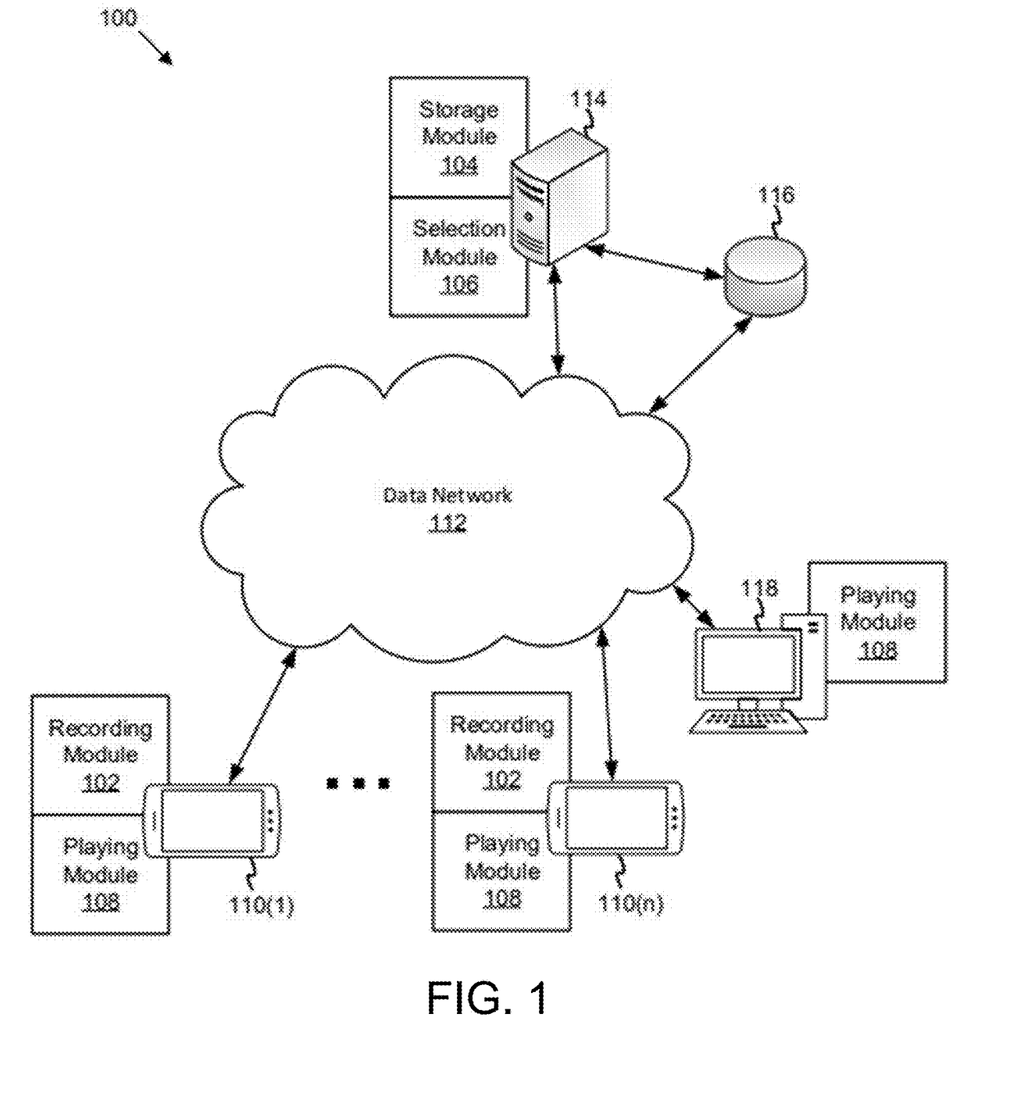
FIG. 1 is a schematic block diagram illustrating one embodiment of a system for multiple independent video recording integration.

FIG. 1 depicts one embodiment of a multiple independent video recording integration 100 system. The system 100 may include a recording module 102, storage module 104, selection module 106, and playing module 108. The system 100 may include one or more recording devices 110(1)-(n). The system 100 may include a data network 112. The system 100 may include a server 114 and/or database 116. The system 100 may include a client device 118.

In one embodiment, the recording module 102 may be configured to record video and audio. The recording module 102 may execute on a recording device 110(1)-(n). In one embodiment, a recording device 110 may include a phone, such as a cell phone, smart phone, or the like. In one embodiment, a recording device 110 may include a tablet computer, laptop computer, desktop computer, or the like. In one embodiment, a recording device 110 may include a smart watch or other wearable computing device. In one embodiment, the recording device 110 may include a video camera such as a drone camera, a personal video camera, an action camera such as a GOPRO camera, a body camera, web camera, or the like. In one embodiment, the recording device 110 may include a camera such as a still camera that can record video and/or audio. In one embodiment, the recording device 110 may include a multi-camera video recording device, such as a 360-degree view camera. In one embodiment, the recording device 110 may include a virtual reality headset such as virtual reality googles. In one embodiment, the recording device 110 may include the recording module 102. In one embodiment, the recording device 110 may include software that includes the recording module 102, such as an app, widget, or the like.

In one embodiment, the recording module 102 may receive video and/or audio signals from the recording device 110(1)-(*n*). The recorded video may include video of any video file format. For example, in certain embodiments, the recorded video may include a WebM, Flash Video, GIF, AVI, MP4 file, a proprietary video format file, or any other video file format. The recorded audio may include audio of any audio file format. For example, in certain embodiments, the recorded audio may include a MP3, OGG, WAV, WebM file, a proprietary audio format file, or any other audio file format. In one embodiment, the video file may include audio. In one embodiment, the recording module 102 or another module may convert the recorded video and/or audio to a file format compatible with the playing module 108, one or more recording devices 110(1)-(*n*), a server 114, a database 116, a certain client device 118, or the like. In one embodiment, in response to recording video and/or audio, the recording module 102 may generate metadata.

In one embodiment the metadata may include time and/or date of recording, geo-location of recording, direction of recording (the direction the camera faces while recording), and/or altitude of recording. In one embodiment, the time and/or data of recording may include a start time and end time of recording, a start time and a recording duration time, or the like. In one embodiment, the metadata may include a username, recorder and/or producer information, text description, a category or genre of the video, a tag for the video, camera information, or the like.

Metadata to include an additional tagging and automation mechanism. This metadata function is defined as a "^Carets Video" or "^Caret Video" which is further defined below.

In one embodiment, the recording module 102 may upload the recorded video, audio, and/or metadata files to a server 114. In one embodiment, the server 114 may include a desktop computer, a cloud server, a main frame computer, or any other type of server. In certain embodiments, the server 114 may include at least a portion of one or more modules of the system 100. In one embodiment, the one or more modules, one or more recording devices 110(1)-(*n*) or a client device 118 may be communicatively coupled to the server 114 through a data network 112.

In one embodiment, the data network 112 may include a digital communication network that transmits digital communications related to system 100. The data network 112 may include a wireless network, such as a wireless cellular network, a local wireless network, such as a Wi-Fi network, a Bluetooth® network, or the like. The data network 112 may include a wide area network ("WAN"), a storage area network ("SAN"), a local area network ("LAN"), an optical fiber network, the internet, or other digital communication network. The data network 112 may include two or more networks. The data network 112 may include one or more servers, routers, switches, and/or other networking equipment. The data network 112 may also include computer readable storage media, such as a hard disk drive, an optical drive, non-volatile memory, random access memory ("RAM"), or the like.

In one embodiment, another module, such as an upload module may upload the recorded video, audio, and/or metadata files to the server 114. In this manner, a recording device 110 may not connect to the data network 112 and the video, audio, and/or metadata files may be uploaded to the server 114 by a device other than the recording device 110 that includes the recording module 102. In one embodiment, the recording module 102 or another module may upload the video, audio, and/or metadata files to the server 114 as the recording module 102 records the video and/or audio. In this manner, the recording module 102 may provide video, audio, and/or metadata content to the server 114 in real time.

In one embodiment, the recording module 102 or another module may upload a video file to the server 114 and the video file may not include metadata. In one embodiment, a user may input the metadata into the recording module 102 or other module. For example, in one embodiment, a user may input a start time and/or end time of a video, the direction of recording of the video, the altitude of recording the video, or any other metadata including metadata mentioned above. In response to the user inputting the metadata into the recording module 102 or other module, the module may associate or integrate the inputted metadata with the video. In this manner, the recording module 102 or other module may upload videos that were not recorded by the recording module 102. The user may input the metadata before, during, or after the recording module 102 or other module uploads the video, audio, and/or metadata files.

In one embodiment, the system 100 may include a storage module 104. The storage module 104 may be configured to store the recorded video, audio, and metadata files of the recorded video and audio. The storage module 104 may execute on the server 114. In one embodiment, the metadata may include any of the metadata discussed above, such as time and date of recording, geo-location, or the like. In one embodiment, the server 114 may include at least a portion of the storage module 104. In one embodiment, the storage module 104 may store the recorded video, audio and metadata on the server 114. In one embodiment, the storage module 104 may store the recorded video, audio, and metadata in a database such as the database 116.

In one embodiment, the database 116 may include any type of database capable of storing video, audio, and/or metadata files. For example, the database may be a SQL database, object-relational database, NoSQL database, or the like. In one embodiment, the database 116 may store the video, audio, and/or metadata files. In one embodiment, the database 116 may store references to the video, audio, and/or metadata files and the video, audio, and/or metadata files may be stored elsewhere, such as the server 114, a storage array, or the like. In one embodiment, the server 114 may include the database 116 and the database may execute and/or be stored on the server 114. In one embodiment, the database 116 may execute and/or be stored on device other than the server 114. The server 114 and the database may communicate via the data network 112 or via a direct link, as depicted in FIG. 1.

In one embodiment, a recording device 110(1)-(*n*) may upload recorded video, audio, and metadata of the recorded video and audio to the server 114. The storage module 104 may process the recorded video, audio, and metadata and store the recorded video, audio, and metadata. In certain embodiments, processing the recorded video, audio, and metadata may include converting one or more files of recorded video, audio, and/or metadata do a different file format. In one embodiment, the processing may include adding metadata to or associating metadata with the recorded video and/or audio files. In one embodiment, the storage module 104 may store videos being uploaded in real time. The storage module 104 may store the entire video after the uploading in real time has ceased.

In one embodiment, the system 100 may include a selection module 106. The selection module 106 may be configured to select one or more recorded video and audio. The one or more selected video and audio may include videos that do not depict the same event or content. The one or more selected video and audio may include video and audio content unrelated to each other. The selection module 106 may execute on the server 114. In one embodiment, each recorded video and audio were recorded on different recording devices 110(1)-(*n*) not directly networked together. As used herein, "not directly networked together" in one embodiment may include the recording devices 110(1)-(*n*) not being physically connected, for example via a cable. In one embodiment, "not directly networked together" may include the recording devices 110(1)-(*n*) not being connected via a LAN, WAN, wireless network such as a Wi-Fi network, a cellular network, or the like. The recording device 110(1)-(*n*) may not be in direct communication with one another. In one embodiment, the selection module 106 may select one or more video and audio files stored by the storage module 104, on the server 114, the database 116, or the like. In one embodiment, the selection module 106 may select a video stored on third-party server and the server 114 and/or third-party database 116 may include metadata associated with that video stored on the third-party server. In this manner, the selection module 106 may select one or more videos not stored on the server 114 or in the database 116.

The selection module 106 may select one or more recorded video and audio in a variety of ways. In one embodiment, the selection module 106 may receive a search query. In one embodiment, a client device 118 may send a search query via the data network 112. In one embodiment, the selection module 106 may parse the search query and/or process the search query to select videos relevant to the search query.

In one embodiment, the search query may include one or more search terms specifying a title or description of a video. The selection module 106 may select certain videos based, at least in part, on the metadata of those videos including title or description data similar to the title or description specified in the search query. In one embodiment, the search query may include one or more search terms specifying a geo-location. The selection module 106 may select certain videos based, at least in part, on the metadata of those videos including recording geo-location data near a geolocation specified in the search query. In one embodiment, the search query may include geo-location data associated with the geo-location of the client device 118 submitting the search query. In this manner, the selection module 106 may select one or more videos that were recorded near the location of the client device 118. In one embodiment, the search query may include the geo-location data associated with the geo-location of the client device 118 without a user manually inputting the geo-location data.

In one embodiment, the search query may include one or more search terms specifying a date. The selection module 106 may select certain videos based, at least in part, on the recording date metadata of those videos close to the date data specified in the search query or the recording date metadata being within a range of dates specified in the search query. In one embodiment, the search query may include one or more search terms specifying a time. The selection module 106 may select certain videos based, at least in part, on the metadata of those videos including recording time metadata close to the time specified in the search query or the recording time metadata being within a range of one or more times specified in the search query. In certain embodiments, the search query may include one or more search terms specifying content of another piece of metadata. The selection module 106 may select certain videos based, at least in part, on the metadata of those videos including metadata similar to the piece of metadata specified in the search query. In one embodiment, the selection module 106 may select video content that is being uploaded to the server 114 in real time.

In one embodiment, a video may include metadata indicating that the video is accessible to certain users. In one embodiment, in response to the search query not indicating that the user generating the search query is permitted to access a video as indicated by the video's metadata, the selection module 106 may not select the video.

In certain embodiments, in response to the selection module 106 selecting one or more videos, the selection module 106 may send the selected videos to a client device 118. In one embodiment, sending the selected videos to a client device 118 may include sending one or more video files, audio files, and/or metadata files. In one embodiment, sending a selected video to a client device 118 may include sending a hyperlink or other reference of one or more video files, audio files, and/or metadata files. The selection module 106 may send the selected videos to a client device 118 via the data network 112.

In one embodiment, the client device 118 may include a phone, such as a cell phone, smart phone, or the like. In one embodiment, the client device 118 may include a tablet computer, laptop computer, desktop computer, or the like. In one embodiment, the client device 118 may include a smart watch or other wearable computing device. In one embodiment, the client device 118 may include a virtual reality headset. In one embodiment, the client device may include virtual reality room. A virtual reality room may include a room with one or more walls and the walls may include one or more screens for playing videos. The virtual reality room may include one or more speakers for playing audio. In one embodiment, the client device may include the playing module 108. In one embodiment, the client device may play one or more videos using the playing module 108, an Internet browser, or any other software capable of playing the selected videos, or any other combination of software.

In one embodiment, the system 100 may include a playing module 108. The playing module 108 may be configured to play one or more recorded video and audio. The playing module 108 may execute on the one or more recording devices 110(1)-(*n*) and/or the client device 118. In some embodiments, the playing module 108 may execute on a device that includes the recording module 102 such as recording device 110(1)-(*n*). In some embodiments, the playing module may execute on a device that does not include the recording module 102 such as the client device 118. In one embodiment, a program, software, hardware, or the like may include both the recording module 102 and the playing module 108. Furthermore, in some embodiments, one or more recording devices 110(1)-(*n*) may not include the playing module 108, for example, where a recording device 110(1)-(*n*) may include a personal camera without playback capabilities.

In one embodiment, playing one or more recorded video and audio may include synchronizing the one or more recorded video and audio based, at least in part, on the metadata of each of the recorded video and audio. In this manner, the client device 118 may play multiple videos that were recorded simultaneously (or substantially simultaneously) by different recording device 110(1)-(*n*) and the recorded videos were not connected, associated, or the like on the server 114 and/or the database 116. In one embodiment, the playing module 108 may be configured to play one or more video and/or audio files that are being uploaded to the server 114 in real time. In this manner, the playing module 108 may stream in real time one or more videos in addition to or in place of recorded videos.

In one embodiment, the playing module 108 may synchronize multiple videos received from the selection module 106. The playing module 108 may synchronize the videos based, at least in part, on the metadata of the recorded videos. In one embodiment, the metadata of the recorded videos may include the time and date the videos were recorded. The playing module 108 may play the videos such that each video plays the portion of the video corresponding to a certain playback time.

For example, in one embodiment, the playing module 108 may play a first video and a second video. The metadata of the first video may indicate that the first video was recorded on Jan. 1, 2015 from 8:00:00 AM to 8:10:00 AM and the metadata of the second video may indicate that the second video was recorded on Jan. 1, 2015 from 8:07:00 AM to 8:12:00 AM. The playing module 108 may synchronize the videos based on the time of recording. The playing module 108 may play the first video and the second video such that each video simultaneously depicts the portion of the video corresponding to a current playback time, for example, 8:08:10 AM.

In one embodiment, one or more videos may include different start times and/or end times than other videos. In one embodiment, the playing module 108 may not play one or more videos if one or more videos do not contain a portion corresponding to a certain time. In a further embodiment, in response to the playing module 108 playing a portion of a video corresponding to a certain time where one or more other videos contain a portion corresponding to that time, the playing module 108 may play those one or more other videos. For example, in the above example, while the first video plays one or more portions corresponding to 8:00:00 AM through 8:06:59 AM, the second video may not play. In response to the first video playing a portion corresponding to 8:07:00 AM to 8:10:00 AM, the playing module 108 may play the second video in addition to the first video. In response to the playing module 108 playing a portion of the second video corresponding to 8:10:01 AM to 8:12:00 AM, the playing module 108 may cease playing the first video.

In one embodiment, none of the one or more videos may contain a portion corresponding to a playback time. In one embodiment, in response to none of the videos containing a portion corresponding to a certain playback time, the playing module 108 may skip ahead during playback to a time where at least one video contain a portion corresponding to the time where the playing module 108 skipped ahead to. In this manner, the playing module 108 may play the one more videos and skip gaps in the videos and allow a user to view continuously even where the one or more videos may contain a gap common to all of the one or more videos.

In one embodiment, the playing module 108 may determine the earliest time where all of the multiple videos contain a portion corresponding to that time. In a further embodiment, the playing module 108 may begin playing the videos at that earliest common time. In one embodiment, the playing module 108 may determine the latest time where all of the multiple videos contain a portion corresponding to that time. In a further embodiment, the playing module 108 may stop playing the videos at that latest common time. In one embodiment, a user of the client device 118 may customize when each video begins playing and when each video ceases playing.

In one embodiment, the playing module 108 may receive a hyperlink, a uniform resource locator (URL), or the like from the selection module 106. In response to a user entering the hyperlink into a browser or an application on a device, the playing module 108 may retrieve the videos selected by the selection module 106 and play the videos as described above. The hyperlink content may be based, at least in part, on the one or more videos selected by the selection module 106.

In one embodiment, the playing module 108 may require a user to log into an account in order to play the one or more selected videos. The account may include an account for a software application, an app, a third-party server, a social media platform, or the like. In response to the user logging into an account, the playing module 108 or another module may display one or more possible actions the user may take. For example, in response to the user logging in, the playing module 108 or another module may allow a user to record video using the recording module 102 or some other recording software, view recorded video (recorded by the user or by other user), search for videos as described above, and/or watch one or more videos played by the playing module 108 as described above.

FIGS. 2A, 2B, 2C and 2D depict one embodiment of a graphical display 200 for a mobile device for multiple independent video recording integration. In one embodiment, the graphical display 200 may include one or more videos 201(1)-(*n*).

Figure 2A:
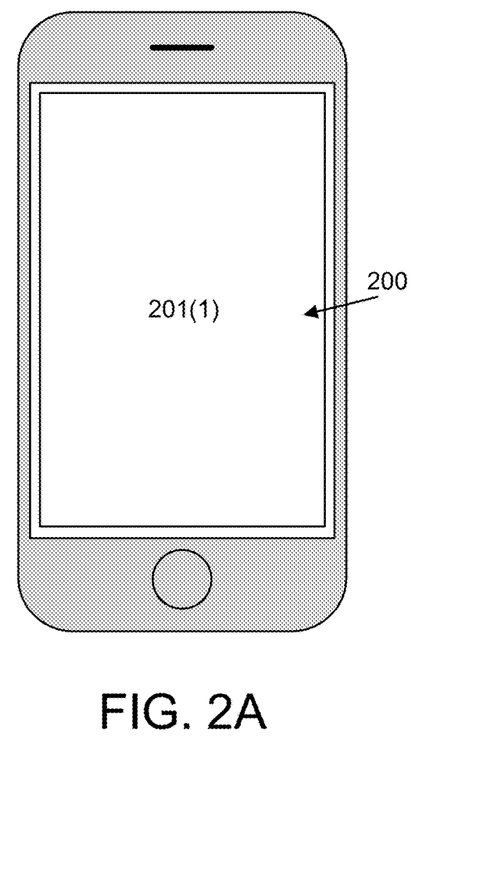
FIG. 2A is a schematic block diagram illustrating one embodiment of a graphical display for multiple independent video recording integration.
Figure 2B:
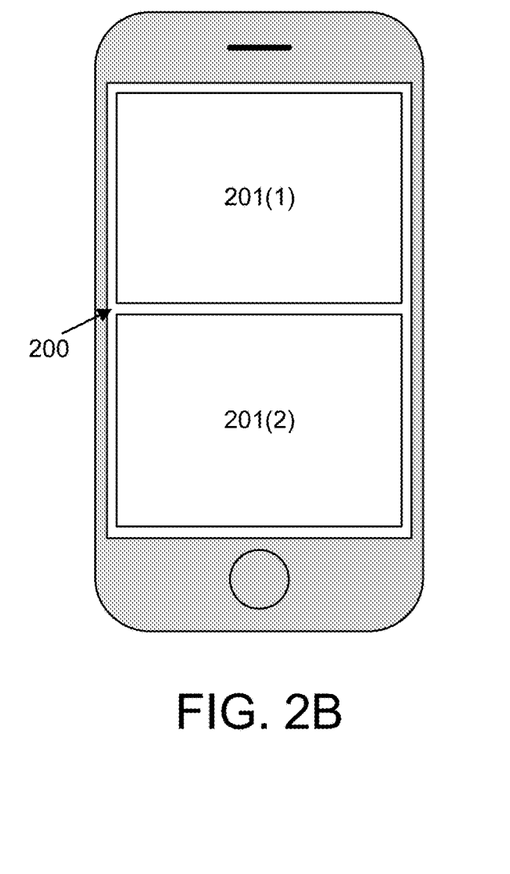
FIG. 2B is a schematic block diagram illustrating a further embodiment of a graphical display for a mobile device for multiple independent video recording integration.
Figure 2C:
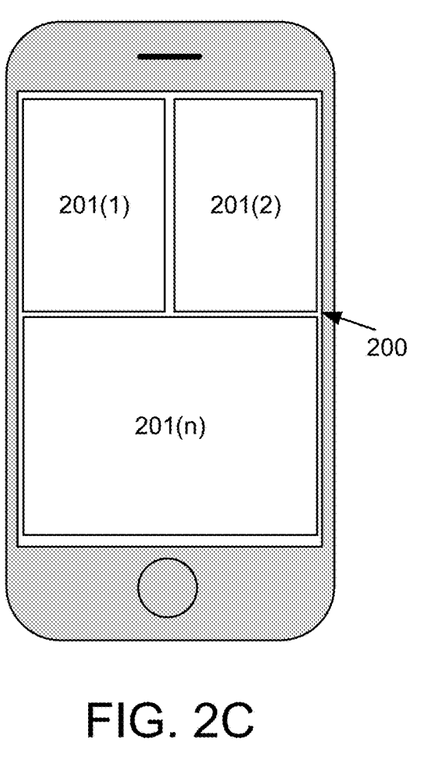
FIG. 2C is a schematic block diagram illustrating a further embodiment of a graphical display for a mobile device for multiple independent video recording integration.

In one embodiment, the mobile device may include a touch screen. A user touching and sliding on the touch screen may scroll up or down or side to side on the graphical display 200 to reveal one or more videos 201(1)-(*n*) not currently displayed. For example, as depicted in FIG. 2B, less than all of the videos 201(1)-(*n*) may be visible on the graphical display 200. Scrolling up may reveal one or more of the one or more videos 201(1)-(*n*) and one or more of the videos 201(1)-(*n*) that were previously visible may no longer be visible, as depicted in FIG. 2C. In some embodiments, in response to the user scrolling, one or more portions of the graphical display 200 may remain on the graphical display. For example, as depicted in FIG. 2C, the navigation interface 206 may remain visible in response to the user scrolling up. In one embodiment, in response to scrolling to the side (scrolling horizontally), the graphical display 200 may cease to display some or all of the one or more videos 201(1)-(*n*).

Figure 2D:
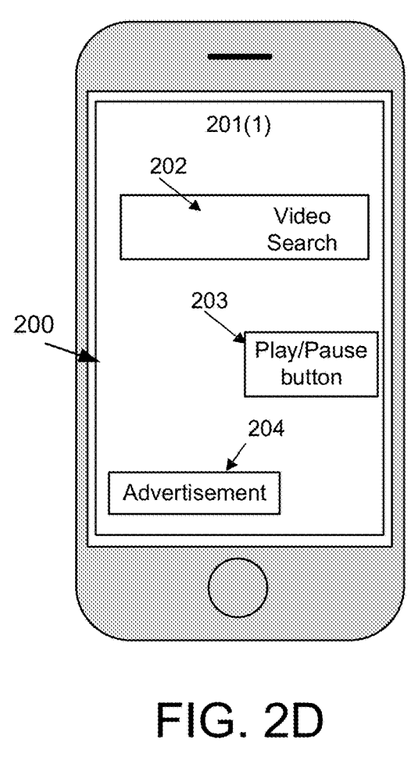
FIG. 2D is a schematic block diagram illustrating a further embodiment of a graphical display for a mobile device for multiple independent video recording integration including video search, play/pause buttons, and advertisements.

FIG. 2D, in one embodiment, the graphical display 200 may include a search interface 202. A user may input data into the search interface 202. In one embodiment, the search interface 202 may include one or more search boxes. Each of the one or more search boxes may correspond to different types of information. For example, as depicted in FIG. 2D, in one embodiment, the search interface 202 may include search boxes for location, dates, times, titles and/or descriptions, usernames, caret video function as described below, and/or producer information, or the like.

The user may input text into the search boxes of the search interface 202. For example, the user may input text in the location search boxes specifying one or more locations. A location may include latitude/longitude, an address, a city, a country, a landmark, or the like. The user may input text in the time search box specifying one or more times. The one or more times may include a time, a range of times, or the like. The user may input text in the date box specifying one or more dates. The one or more dates may include a date, a range of dates, or the like. In one embodiment, a search box may include prepopulated data that a user may select.

In one embodiment, although not depicted, the search interface 202 may include a map. The map may display one or more icons and each icon may indicate that a video was recorded at the location represented by the icon. A user may search the map using a time or a range of times to search for videos recorded during the times indicated by the user.

In one embodiment, the graphical display 200 or other software may process the inputted search data. Processing the inputted search data may include converting the search data into a search query. The search query may include a string of text in a certain format. The search query may be parseable by software/hardware of the server 114, the selection module 106, or the like. The graphical display 200, the playing module 108, another module, or other software/hardware may send the search query to the server 114, selection module 106, or the like.

In one embodiment, the graphical display 200 may include one or more videos 201(1)-(n). The one or more videos 201(1)-(n) may include the videos selected by the selection module 106 and sent to the playing module 108. The playing module 108 may play the one or more videos 201(1)-(n). The graphical display 200 may include any number of videos 201(1)-(n).

In one embodiment, the one or more videos 201(1)-(n) may be arranged vertically, as depicted in FIG. 2A. In one embodiment, the one or more videos 201(1)-(n) may be arranged horizontally, vertically, and/or side by side. In one embodiment, the one or more videos 201(1)-(n) may be arranged in a grid or in rows and columns. In one embodiment, the one or more videos 201(1)-(n) may not all fit onto one screen of the graphical display 200. The graphical display 200 may display one or more videos 201(1)-(n) that are not visible on another screen in response to a user scrolling, sliding on a touchscreen, or the like. In one embodiment, a user may adjust the size of each video of the one or more videos 201(1)-(n). In one embodiment, a user may adjust the position of the one or more videos 201(1)-(n). For example, in one embodiment, the user may reorder the sequence of the one or more videos 201(1)-(n) within the graphical display 200.

In certain embodiments, the graphical display 200 may arrange the one or more videos 201(1)-(n) in a variety of ways. In one embodiment, the graphical display 200 may arrange the one or more videos 201(1)-(n) according to location, start time, end time, length of video, or the like.

In one embodiment, each video of the one or more videos 201(1)-(n) may include audio separate from the other one or more videos 201(1)-(n). Each video may include a volume control and the volume of a video may adjust in response to a user adjusting the interacting with the volume control of the video. In one embodiment, each video of the one or more videos 201(1)-(n) may include a sound focus button. In response to a user pressing a sound focus button, the playing module 108 may mute the volume of the one or more videos 201(1)-(n) except for the video that corresponds to the sound focus button the user pressed. For example, a user may press the sound focus button associated with the video 201(1). In response, the playing module 108 may mute the volume of the videos 201(2)-(n).

In one embodiment, the graphical display 200 may not display a video of the one or more videos 201(1)-(n) in response to the video not containing a portion corresponding to the current playback time of the other videos. In response to the video containing a portion corresponding to the current playback time, the graphical display 200 may display and play the video.

In one embodiment, the graphical display 200 may display user/producer information for each video of the one or more videos 201(1)-(n). The user/producer information may include the username of the user that uploaded and/or recorded the video, the name of the user that recorded and/or uploaded the video, or the like.

In one embodiment, the graphical display 200 may include a navigation interface having one or more media control buttons. The media control buttons may include a play/pause button 203, a play button, a fast-forward button, a pause button, and a rewind button. In one embodiment, the playing module 108 may play the one or more videos 201(1)-(n) and, in response to the user pressing the play/pause button, the playing module 108 may pause all of the videos of the one or more videos 201(1)-(n).

In response to the user pressing the play/pause button 203 where the videos are paused, the playing module 108 may resume playing all the videos of the one or more videos 201(1)-(n). In one embodiment, in response to the user pressing and/or holding the fast forward button, the playing module 108 may fast forward or skip ahead all of the videos of the one or more videos 201(1)-(n). In one embodiment, in response to the user pressing and/or holding the rewind button, the playing module 108 may rewind or skip back all of the videos of the one or more videos 201(1)-(n). The fast-forward and/or rewind may be at any speed.

In one embodiment, the graphical display 200 may include one or more advertisements 204 as depicted in FIG. 2D. An advertisement may include a video advertisement, a static advertisement, a watermark placed on or within the video content, or the like. In one embodiment, a static advertisement may include text, images (including moving images), hyperlinks, or the like. An advertisement may include audio and may include an interface to adjust the volume of the audio or mute the audio. The graphical display 200, the playing module 108, or the like may receive the advertisement from the server 114, the database 116, or another location such as a third-party server.

In one embodiment, an advertisement 204 may be disposed above, below, or to the side of the one or more videos 201(1)-(n). In one embodiment, an advertisement 204 may overlay a video 201(1)-(n). For example, the advertisement 204 may include a static advertisement that is disposed over a portion of a video 201(1)-(n). In one embodiment, an advertisement 204 may be disposed in the place of one or more videos 201(1)-(n). The graphical display 200 may display the advertisement before, during, or after playing one or more videos 201(1)-(n).

For example, in one embodiment, before, during, or after the playing module 108 plays a first video 201(1), the playing module 108, the graphical display 200, or the like may play a video advertisement and the video advertisement may be disposed on the graphical display 200 where graphical display 200 displays the first video 201(1). In certain embodiments, in response to playing a video advertisement during playback of a video 201(1)-(*n*), the playing module 108 may pause the playback of one or more videos 201(1)-(*n*). In one embodiment, the playing module 108 may pause all the videos 201(1)-(*n*).

In one embodiment, a video advertisement may play during playback of one or more videos 201(1)-(*n*). For example, a first video 201(1) may have an end time at 2:15:00 PM and a second video 201(2) have an end time at 2:16:00 PM. In one embodiment, in response to the first video 201(1) playback reaching 2:15:00 PM, the graphical display 200 may cease displaying the first video 201(1) and may play a video advertisement disposed on the graphical display 200 where the first video 201(1) was displayed. The video advertisement may play while the second video 201(2) is still playing. In one embodiment, the video advertisement may play when none of the one or more videos 201(1)-(*n*) play. In one embodiment, the advertisement may not include audio in order to not overlap with the audio of the one or more videos 201(1)-(*n*). In one embodiment, in response to none of the one or more videos 201(1)-(*n*) playing, an advertisement may play audio.

Figure 3:
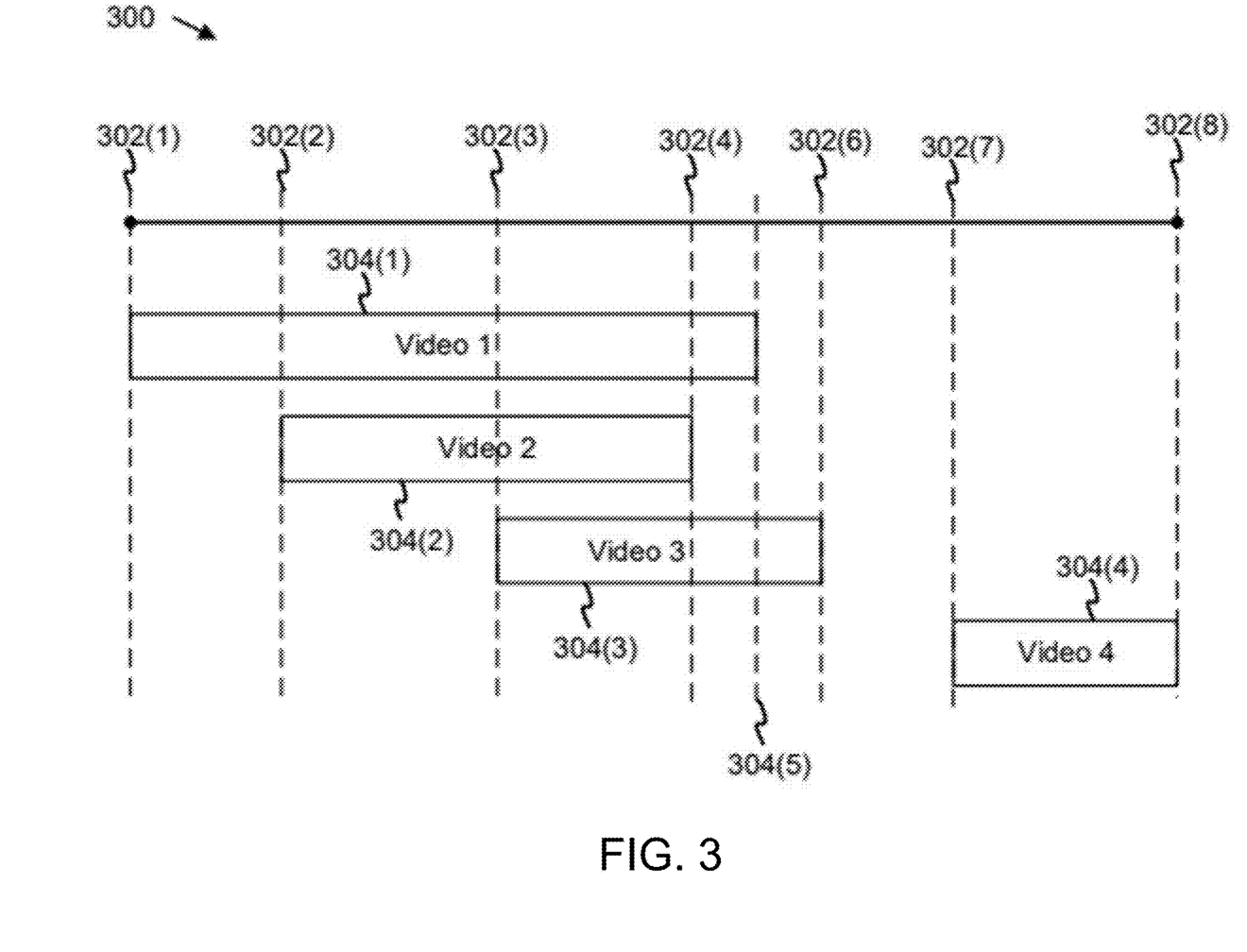
FIG. 3 is a schematic block diagram illustrating one embodiment of a timeline for multiple independent video recording integration.

FIG. 3 depicts one embodiment of a timeline 300 for the graphical display 200 displaying one or more videos. The timeline 300 from left to right represents the flow of time. At time 302(1), the graphical display 200 may display the video 201(1) in response to the video 201(1) containing a portion corresponding to the current playback time. In response to the video 201(1) containing a portion corresponding to the current playback, the playing module 108 may begin the video playback 304(1). At time 302(2), the graphical display 200 may display the video 201(2). In response to the video 201(2) containing a portion corresponding to the current playback, the playing module 108 may begin the video playback 304(2). At time 302(3), the graphical display 200 may display the third video 201(3). In response to the video 201(3) containing a portion corresponding to the current playback, the playing module 108 may begin the video playback 304(3).

At time 302(4), the graphical display 200 may cease displaying the video 201(2) in response to the video 201(2) not containing a portion corresponding to the current playback time. In response to the video 201(2) not containing a portion corresponding to the current playback, the playing module 108 may cease the video playback 304(2) of the video 201(2). At time 302(5), the graphical display 200 may cease displaying the first video 201(1). In response to the video 201(1) not containing a portion corresponding to the current playback, the playing module 108 may cease the video playback 304(1) of the video 201(1). At time 302(6), the graphical display 200 may cease displaying the video 201(3). In response to the video 201(3) not containing a portion corresponding to the current playback, the playing module 108 may cease the video playback 304(3) of the video 201(3).

From time 302(6) to 302(7), the playing module 108 may not play a video. In response to the playing module 108 not playing a video, the playing module 108 may skip ahead to a time where the playing module 108 plays at least one video. At time 302(7), the graphical display 200 may display the fourth video 201(4). In response to the video 201(4) containing a portion corresponding to the current playback, the playing module 108 may begin the video playback 304(4) of the video 201(4). At time 302(8), the graphical display 200 may cease to display the fourth video 201(4). In response to the video 201(4) not containing a portion corresponding to the current playback, the playing module 108 may cease the video playback 304(4) of the video 201(4).

In one embodiment, a user may create a composite video that includes one or more segments from the one or more videos 201(1)-(*n*). It may also be created automatically. The user may select a first video and a start time and end time for a segment of the first video. The user may select a second video and a start time and end time for a segment of the second video. The user may continue this process until the user has finished selecting video segments. A composite video generating module may combine the video segments selected by the user and generate a single video that includes the selected video segments. In the above embodiments, the terms "first video," "second video," etc. do not necessarily indicate different videos. For example, a user may select a first video, then a second video different from the first video, and then the first video again.

Figure 4A:
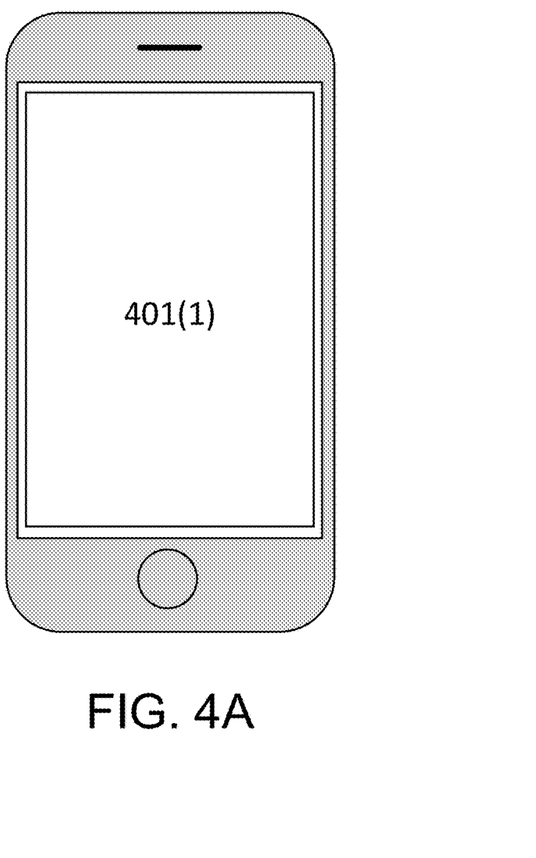
FIG. 4A is a schematic block diagram illustrating the recording independent videos.
Figure 4B:
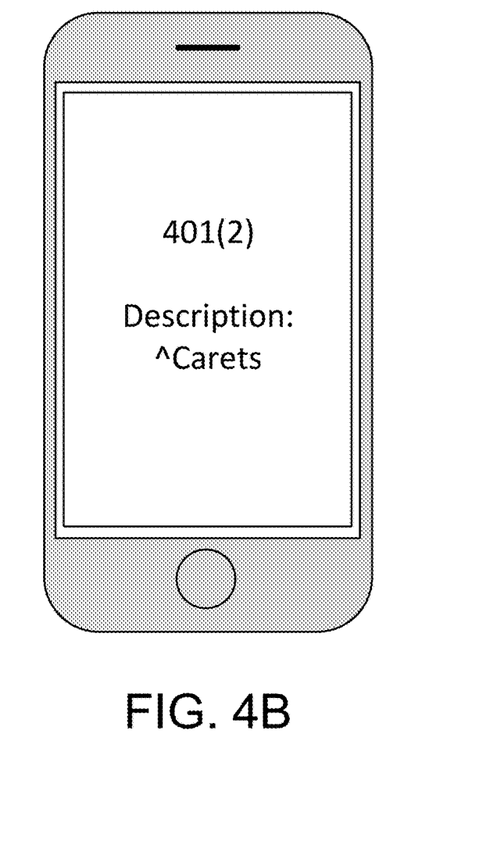
FIG. 4B is a is a schematic block diagram illustrating the naming of videos and integrating metadata in naming convention.

FIGS. 4A and 4B depict one embodiment of recording a video 401(1), e.g., using a recording device 110 containing a recording module 102, as described above. At FIG. 4A, the recording device 110 records may capture audio with the video 401(1).

At FIG. 4B, upon completion of creating a video 401(1), the user may add a description 401(2) may be added to include features such as text, hashtags, and at-user tagging. In one embodiment, the description 401(2) may include the addition of tagging metadata intended to trigger automated aggregation of video content. In the depicted embodiment, the tagging metadata is added prior to upload, e.g., to a storage module 104.

In some embodiments, the automated mechanism for aggregating and combining content is based on a two-step process. The first step includes the use of a symbol, term, letter, word, or number to trigger the consolidation function followed by symbols, terms, letters, or numbers in the description naming convention to determine which videos are aggregated based on similar naming conventions. The second step includes aggregating and combining the content based on the triggering symbol, term, letter, word, or number.

An example of tagging using this convention to trigger video aggregation includes "^Caret" to include both the symbol "^" to trigger aggregation and the term "Caret" to identify which videos are to be combined and shown in 201(1)-(*n*). In the event two or more videos have "^Caret" in the description these two or more videos would then be automatically combined. Another example being "^BasketBall" to include the symbol "^" to trigger the automated function and the term "BasketBall" to determine which videos are to be combined. These combined videos created using this automated mechanism are being described as a "Caret video" or "Carets video".

Videos may also be automatically consolidated based on a trigger designation, selector switch, or other mechanism within the user interface triggering content to be aligned in terms of both geo location and time and not including the metadata, as described below.

User may have the option to select a different audio track than what was recorded as part of the video to be played back with the individual or combined carets video. This alternate provides the user with the option to integrate a different audio track to be played in alignment with the individual and caret videos.

Returning to FIG. 2A, in one embodiment, a user may interact with the graphical display 200 to adjust the graphical display 200. For example, as mentioned above, one or more portions of the graphical display 200, such as one or more videos of the one or more videos 201(1)-(n), the map, or the like may not be visible to the user because those portions may not fit on the screen displaying the graphical display 200. A user may interact with the graphical display to reveal these portions. For example, in response to a user scrolling with a mouse wheel, using one or more keys of a keyboard, or swiping on a touchscreen, the graphical display 200 may show one or more portions of the graphical display 200 that were previously not displayed.

In one embodiment, one or more modules of the system 100 may be integrated into a social media platform. The social media platform may display one or more synchronized videos of one or more users of the social media platform. In one embodiment, users of the social media platform may upload the one or more videos to the social media platform. In one embodiment, the social media platform may retrieve the one or more videos from the server 114. A user of the social media platform may view the one or more videos in response to the user being connected with one or more users of the social media platform that uploaded the one or more videos. In one embodiment, the social media platform may include a preexisting social media platform. In one embodiment, the social media platform may include a social media platform designed, configured, or the like for the system 100 and/or the modules of the system 100. In one embodiment, the server 114 and/or database 116 may include at least a portion of the social media platform.

In one embodiment, the selection module 106 may generate a hyperlink to an interface with the one or more videos such as the graphical display 200, as described above. In one embodiment, the hyperlink may be integrated into a social media platform. For example, a user may post the hyperlink on a social media platform. In one embodiment, in response to the hyperlink being integrated into the social media platform, the social media platform may display the hyperlink and allow users of the social media platform to interact with the link or view content from system 100. For example, in one embodiment, a user may post a hyperlink to a video-watching interface (such as the graphical display 200) on a social media platform. The hyperlink may appear on a web page associated with the user of the social media platform. The hyperlink may be visible to one or more users of the social media platform, for example, to connections of the user that posted the hyperlink. In one embodiment, a user interacting with the hyperlink may include a user accessing the hyperlink and opening the video-watching interface, for example, in a browser. In one embodiment, the video-watching interface may be embedded in a webpage of the social media platform. In one embodiment, the user posting the hyperlink on the social media platform may input data into the social media platform to be associated with the hyperlink. For example, in one embodiment, the user may input text about the one or more videos and the text may be displayed with the hyperlink and/or the embedded video-watching interface. In one embodiment, for example, the user may input one or more tags and the tags may allow other users to search on the social media platform for user posts containing those tags.

In one embodiment, the system 100 may include a video networking module. The video networking module may execute and/or be stored on the server 114 or another computing device. The video networking module may execute a video networking platform. The storage module 104, the server 114, and/or the database 116 may store data of the video networking platform. A user may access the video networking platform through a client device 118 and/or a recording device 110(1)-(n), for example, by using an Internet browser, an app, or other software.

In one embodiment, the video networking platform may include one or more user accounts. Two or more user accounts may be connected. Two or more user accounts being connected may include the two accounts designating each other as friends, contacts, or the like. In response to a user logging into his or her user account, the user may view his or her video networking homepage. A user account's video networking homepage may include videos uploaded by one or more user accounts connected to the user's account. In one embodiment, a user's account video networking homepage may include videos uploaded by user accounts connected to user accounts that are connected to the user. For example, a first user account may be connected to a second user's account and a third user's account may be connected to the second user's account. In response to the third user uploading a video, the second user's account (a user account connected to the third user's account) networking homepage may include the third user's video and the first user's account (a user account connected to the second user's account) networking homepage may include the third user's video. The user's account's video networking homepage may include linked videos, as described below. The user's account's video networking homepage may include videos viewable to all users in the video networking platform. In one embodiment, a user's account homepage may include one or more videos grouped and/or synchronized where the metadata associated with those videos includes specific metadata, for example, a certain description tag specified by the account's user. For example, in one embodiment, a user may configure the user's account's video networking homepage to automatically display and synchronize all videos where the metadata of the videos include a specific description tag.

In one embodiment, the video networking platform may include a graphical display. The graphical display may include a display similar or identical to the graphical display 200 of FIG. 2A. The graphical display may display one or more synchronized videos. A user may play the one or more videos of the graphical display in response to at least one of the videos being accessible to the user account. A video may be accessible in response to the video being uploaded by a connected user, the video being linked to a video of the user, or the like as described above. In one embodiment, a user may add text data to the graphical display. For example, a user may add a description to the one or more synchronized videos where the user uploaded at least one of the synchronized videos or may add a comment to the one or more synchronized videos.

In one embodiment, the system 100 may include a video linking module. The video linking module may determine that two or more videos recorded by two or more different users may be candidates for linking based at least in part on the metadata of the two or more videos. The video linking module may determine this in a variety of ways. In one embodiment, the video linking module may determine that the two or more videos were recorded in close geographic proximity to each other. The video linking module may determine that two or more videos were recorded in close geographic proximity to each other based at least in part on geo-location metadata of each video of the two or more videos. In response to the video linking module determining that two or more videos were recorded in close geographic proximity to each other, the video linking module may send a linking request to the recording devices 110(1)-(n) of the users that recorded the two or more videos. The linking request may include a message asking each user permission to link to another users' one or more videos with the other users' one or more videos that were recorded in close proximity. In response to the users answering the request and giving permission, the video linking module may link the two or more videos. Linking the two or more videos may include adding metadata to each of the two or more videos. The metadata may include data about the linked videos such as a location of the videos on the server 114 or in the database 116.

In one embodiment, as described above, the selection module 106 may select a video based on the metadata of the video matching or being similar to one or more portions of a search query. In response to the selection module 106 selecting that video, the selection module 106 may select one or more videos linked the selected video. The selection module 106 may send the linked videos to the playing module 108 in addition to the selected video. The playing module 108 may indicate to a user that the one or more linked videos are linked to the selected video. In one embodiment, in response to the selection module 106 sending a video that matches a search query to the playing module 108, the selection module 106, the video linking module, or another module, may automatically send one or more videos that are linked to the video sent by the selection module 106 to the playing module 108.

In one embodiment, the social networking platform or a video networking platform, as described above, may include the video linking module. The social/video networking platform may execute the video linking module and may link, present, display, etc. the one or more videos associated with the social/video networking platform. In one embodiment, the one or more linked videos may not have been uploaded by user accounts that are connected on the social/video networking platform, as described above. In another embodiment, the users that uploaded the one or more linked videos may be connected. In one embodiment, the one or more linked videos may be linked on the social/video networking platform (for example, by referencing one another in metadata stored on the social/video networking platform) but the one or more linked videos may not be linked on the server 114 or the database 116.

It should be noted that this video linking, as described above, should not be confused with linking the recording devices 110(1)-(n) that recorded the one or more linked videos. The one or more recording devices 110(1)-(n) independently recorded the one or more videos linked together by the video linking module and the one or more recording devices 110(1)-(n) may not be associated with one another, as described above in relation to independent recording devices 110(1)-(n).

Figure 5:
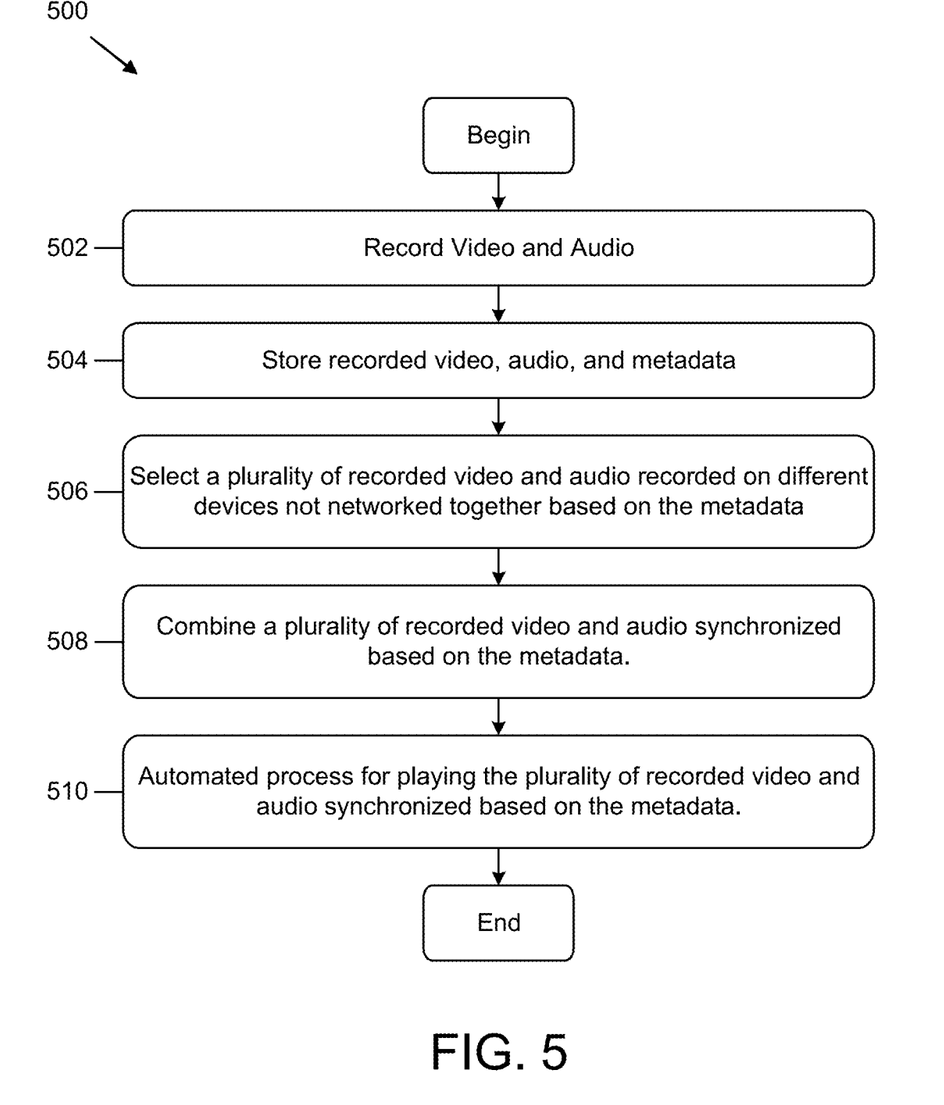
FIG. 5 is a schematic flowchart diagram illustrating one embodiment of a method for multiple independent video recording integration.

FIG. 5 depicts one embodiment of a method 500 for multiple independent video recording integration. In one embodiment, the method 500 begins and may include recording 502 video and audio. The method 500 may include storing 504 the recorded video, audio, and metadata. The method 500 may include selecting 506 one or more recorded video and audio recorded on different devices not networked together. The method 500 may include the automated combining 508 one or more recorded video and audio files based on metadata. The method 500 may include the automated playback 510 of one or more recorded video and audio synchronized based on the metadata and the method 500 ends.

Disclosed herein is a video networking system comprising at least a video networking platform, a video linking module, a video networking module, and a playback module. The video network platform includes two or more user accounts, where each user account is configured to upload one or more recorded videos to the video networking platform, each recorded video including metadata.

In some embodiments, the metadata comprises one or more of: A) one or more timing metadata; B) a geo-location; C) a tagging and naming convention used to trigger and automate video aggregation; D) a time that the recorded video was recorded; or E) a combination thereof.

The video linking module is configured to determine, based at least in part on the metadata of two or more recorded videos recorded by two or more different users, that the two or more recorded videos are candidates for linking. In such embodiments, the video linking module is further configured to send a linking request to the two or more different users that recorded the two or more recorded videos, and to link the two or more recorded videos.

The video networking module is configured to display one or more videos to the one or more user accounts. The playback module is configured to play the one or more displayed videos. In such embodiments, playing the one or more displayed videos includes synchronizing the one or more displayed videos based at least in part on the metadata of the one or more displayed videos.

In some embodiments, the playback module is configured to automate the playing of the one or more displayed videos without user input. In certain embodiments, automating the playing of the one or more displayed videos includes aligning the one or more displayed videos based at least in part on one or more variables contained within the metadata. In some embodiments, the playback module receives a resource that points to the one or more displayed videos, and wherein the resource comprises one of a hyperlink or a URL.

In some embodiments, the playback module is further configured to automatically display a set of videos having metadata and to synchronize playback of the set of videos based at least in part on the metadata of the set of videos. In some embodiments, the video networking system may further include an integration module configured to integrate advertisements into the one or more displayed videos.

In some embodiments, the video networking system may further include an audio module configured to enable a user, via an interface, to select an alternative audio track for automatic integration into the one or more displayed videos.

In some embodiments, the video networking system may further include a search interface configured to receive input data from a user. In such embodiments, the input data may include: A) a location; B) a date; C) a time; D) a title; E) a description; F) a username; G) a producer; H) a trigger; or I) a combination thereof. In certain embodiments, the trigger comprises a caret symbol "^".

In some embodiments, the video networking system may further include a user interface, wherein the video networking system is configured to consolidate a set of videos based on a trigger designation or a selector switch within the user interface.

Disclosed herein is a method for automating the aggregation of independent videos for integration in a video networking system comprising one or more user accounts. The method includes receiving two or more recorded videos, wherein each recorded video comprises metadata, wherein each user account is configured to upload one or more recorded videos to the video networking system. The method includes determining, based at least in part on the metadata of the two or more recorded videos recorded by two or more different users, that the two or more recorded videos are candidates for linking.

The method includes sending a linking request to the two or more different users that recorded the two or more recorded videos. The method includes linking the two or more recorded videos. The method includes presenting, via an electronic display, one or more videos to a user. The method includes playing the one or more presented videos, wherein playing the one or more presented videos comprises synchronizing the one or more presented videos based at least in part on the metadata of the one or more presented videos.

In some embodiments, wherein playing the one or more presented videos comprises automatically playing the one or more videos without user input. In certain embodiments, automatically playing the one or more presented videos comprises aligning the one or more presented videos based at least in part on one or more variables contained within the metadata.

In some embodiments, the method further includes receiving a resource that resource points to the one or more presented videos. In such embodiments, the resource may include a hyperlink or a uniform resource locator (URL), or both.

In some embodiments, the method further includes receiving input data from a user. In such embodiments, the input data may include: A) a location; B) a date; C) a time; D) a title; E) a description; F) a username; G) a producer; H) a trigger; or I) a combination thereof. In certain embodiments, the trigger comprises a caret symbol "^".

In some embodiments, the method further includes automatically displaying a set of videos having metadata and synchronizing playback of the set of videos based at least in part on the metadata of the set of videos. In some embodiments, the method further includes consolidating a set of videos based on a trigger designation or a selector switch within a user interface.

Disclosed herein is a computer program product comprising a non-transitory computer readable storage medium storing code, the code being configured to be executable by a processor to perform operations comprising: A) receiving two or more recorded videos at a video networking system comprising one or more user accounts, wherein each recorded video comprises metadata, wherein each user account is configured to upload at least one video to the video networking system; B) determining, based at least in part on the metadata of the two or more videos recorded by two or more different users, that the two or more videos are candidates for linking; C) sending a linking request to the two or more different users that recorded the two or more videos; D) linking the two or more recorded videos; E) presenting, via an electronic display, one or more recorded videos; and F) playing the one or more presented videos, wherein playing the one or more videos comprises synchronizing the one or more presented videos based at least in part on the metadata of the one or more presented videos.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method in a video networking system comprising one or more user accounts, the method comprising:
receiving input data from a user in connection with a video upload, wherein the input data comprises a metadata trigger associated with the video upload, wherein the metadata trigger comprises a special symbol that initiates an identification of two or more recorded videos recorded by one or more different users;
identifying, based on the metadata trigger, the two or more recorded videos recorded by the one or more different users, wherein each recorded video comprises additional metadata, and wherein the additional metadata is different from the metadata trigger;
determining, based at least in part on the additional metadata of the two or more recorded videos that the two or more recorded videos are candidates for linking;
linking the two or more recorded videos;
synchronizing the two or more recorded videos based at least in part on the additional metadata of the two or more recorded videos; and
playing the two or more recorded videos in synchronization.

2. The method of claim 1, wherein playing the two or more recorded videos comprises automatically playing the one or more videos without user input.

3. The method of claim 2, wherein automatically playing the two or more recorded videos comprises aligning the two or more recorded videos based at least in part on one or more variables contained within the additional metadata.

4. The method of claim 1, further comprising receiving a resource which points to the two or more recorded videos, wherein the resource comprises one of a hyperlink or a uniform resource locator (URL).

5. The method of claim 1, wherein the additional metadata comprises one or more of:
a location;
a date;
a time;
a title;
a description;
a username;
a producer;
or a combination thereof.

6. The method of claim 1, wherein the metadata trigger further comprises a term, a letter, a word, or a number concatenated with the special symbol.

7. The method of claim 1, further comprising automatically displaying a set of videos having metadata and synchronizing playback of the set of videos based at least in part on the metadata of the set of videos.

8. The method of claim 1, further comprising aggregating a set of two or more videos based on a trigger designation or a selector switch within a user interface.

9. The method of claim 8, further comprising receiving the trigger designation with a description or naming convention, wherein aggregating the set of two or more videos comprises aggregating the two or more videos further based on the description or naming convention.

10. The method of claim 8, wherein the trigger designation comprises a symbol, a term, a letter, a word, or a number.

11. The method of claim 10, wherein the symbol comprises a caret symbol "^".

12. The method of claim 8, further comprising:
selecting an alternate audio track for the aggregated two or more videos; and
integrating the alternate audio track with the aggregated two or more videos.

13. The method of claim 1, wherein the special symbol comprises a caret symbol "^".

14. The method of claim 1, wherein playing the two or more recorded videos includes displaying an advertisement, and wherein the advertisement comprises a video advertisement, a static advertisement, or a watermark placed on or within two or more recorded videos.

15. An apparatus for aggregating independent videos, comprising:
- a memory; and
- a processor coupled with the memory and configured to cause the apparatus to:
- receive input data from a user in connection with a video upload, wherein the input data comprises a metadata trigger associated with the video upload, wherein the metadata trigger comprises a special symbol that initiates an identification of two or more recorded videos recorded by one or more different users;
- identify, based on the metadata trigger, the two or more recorded videos recorded by the one or more different users, wherein each recorded video comprises additional metadata, and wherein the additional metadata is different from the metadata trigger;
- determine, based at least in part on the additional metadata of the two or more recorded videos that the two or more recorded videos are candidates for linking;
- link the two or more recorded videos;
- synchronize the two or more recorded videos based at least in part on the additional metadata of the two or more recorded videos; and
- play the synchronized two or more recorded videos in synchronization.

16. The apparatus of claim 15, wherein the processor is further configured to aggregate a set of two or more videos based on a trigger designation or a selector switch within a user interface.

17. The apparatus of claim 15, wherein at least one of the two or more recorded videos comprises an advertisement.

18. A computer program product comprising a non-transitory computer readable storage medium storing code, the code being configured to be executable by a processor to perform operations comprising:
- receiving input data from a user in connection with a video upload, wherein the input data comprises a metadata trigger associated with the video upload, wherein the metadata trigger comprises a special symbol that initiates an identification of two or more recorded videos recorded by one or more different users for synchronizing playback of the two or more recorded videos;
- identifying, based on the metadata trigger, the two or more recorded videos recorded by the one or more different users, wherein each recorded video comprises additional metadata, and wherein the additional metadata is different from the metadata trigger;
- determining, based at least in part on the additional metadata of the two or more recorded videos that the two or more recorded videos are candidates for linking;
- linking the two or more recorded videos;
- synchronizing the two or more recorded videos based at least in part on the additional metadata of the two or more recorded videos; and
- playing the two or more recorded videos in synchronization.

19. The apparatus of claim 18, wherein the trigger designation comprises a symbol, a term, a letter, a word, or a number.

20. The apparatus of claim 18, wherein the processor is further configured to receive a description with the trigger designation, and to aggregate the two or more videos further based on the description.

* * * * *